US005532561A

United States Patent [19]
Huang

[11] Patent Number: 5,532,561
[45] Date of Patent: Jul. 2, 1996

[54] VIRTUAL HALL-EFFECT SIGNAL GENERATING FOR A BRUSHLESS SENSORLESS ELECTRICAL ROTARY MACHINE

[75] Inventor: Hao Huang, Montevideo, Minn.

[73] Assignee: SL Montevideo Technology, Inc., Montevideo, Minn.

[21] Appl. No.: 456,076

[22] Filed: May 31, 1995

Related U.S. Application Data

[62] Division of Ser. No. 246,859, May 20, 1994, Pat. No. 5,469,033.

[51] Int. Cl.[6] ........................................ H02P 6/18
[52] U.S. Cl. ............................ 318/439; 318/254
[58] Field of Search ................... 318/138, 254, 318/439

[56] References Cited

U.S. PATENT DOCUMENTS 3,878,557  4/1975  Vidovic .
4,146,908  3/1979  Vandling .
4,236,110  11/1980  Shearer et al. .

Primary Examiner—Bentsu Ro
Attorney, Agent, or Firm—Nixon & Vanderhye

[57] ABSTRACT

Electronic solid state circuitry is provided which takes the place of Hall-effect sensors in brushless DC motors, providing output signals substantially the same as those of Hall-effect sensors. The Hall-effect sensors in existing motors may be deactivated or removed and functionally replaced by the solid state circuit. The circuit may include a number of D flip flops and a NAND gate connected to a voltage controlled oscillator by a switch which is part of a start up circuit. A direction reverse circuit, a sampling logic circuit (to determine which phase is non-energized at a particular point in time), and a commutation error detector circuit are also preferably provided. New motors utilizing the circuitry have increased reliability and precise velocity regulation.

8 Claims, 7 Drawing Sheets

VIRTUAL HALL-EFFECT SIGNAL GENERATING FOR A BRUSHLESS SENSORLESS ELECTRICAL ROTARY MACHINE

This is a divisional of application Ser. No. 08/246,859, filed May 20, 1994, now U.S. Pat. No. 5,469,033, issued Nov. 21, 1995.

BACKGROUND AND SUMMARY OF THE INVENTION

Conventional commercial brushless DC motors use Hall-effect (magnetically operated) sensors. The Hall-effect sensors sense the rotor position and provide a signal to an inverter to commutate to the next phase in sequence when the rotor magnet axis reaches a predetermined position. In this way the motor windings are energized so as to maximize the amount of torque output for the motor at any given speed. However the Hall-effect sensors are structures that limit the motor in a number of different ways.

Hall-effect sensors are typically large compared to solid state circuitry components, and for smaller motors there is a problem in finding enough room to properly mount the sensors. However even assuming that the sensors are already provided in a pre-existing motor, since the maximum operating temperature of the sensors is about 150° C., brushless DC motors utilizing these sensors are not suitable for operating temperatures above F isolation class. Also Hall-effect sensors, due to their complexity, temperature limitation, and other reasons, are responsible for reducing the reliability of brushless DC motors. Further, during manufacture there are difficulties in aligning the sensors, and there are high labor and material costs associated therewith, making AC induction motor users hesitant to switch to high efficiency and high power density brushless DC motors. Also there is a complexity of the connection between the motor and the drive, and sensitivity to wiring orientation, when Hall sensors are utilized.

There have been a number of proposals in the past for making sensorless (that is no Hall-effect sensors) brushless DC motors by using the back emf signal and operating it in a particular way. For example by utilizing conventional chips ML 4410 and ML 4411 developed by Micro Linear, controllers for linear mode brushless DC sensorless motor drives are provided which can operate successfully for motor drives at power levels of those normally required for driving hard discs in personal computers, or where efficiency of the motor is not a consideration. Other proposals include those shown in U.S. Pat. Nos. 5,166,583 and 5,223,772. In U.S. Pat. No. 4,928,043, a phased lock loop is used to phase track the back emf, and in a new motor construction can result in a workable sensorless brushless DC motor.

None of the prior art proposals, however, address the problem of existing motors. That is there are literally tens of thousands of existing brushless DC speed regulating motor drives (e.g. six step) with Hall sensors which are operating in a limited capacity, and/or with less maintainability or reliability which are not cost effective to replace. Also, it is desirable to provide new—in addition to retrofit—construction motors or other electrical rotary machines which have a simple yet versatile construction. That is, it is highly desirable to provide new motors with increased reliability compared to conventional motors, precise velocity regulation, simple installation, and reduced motor cost, size, and weight, as well as quicker response due to reduced rotor inertia.

According to the present invention a method of enhancing DC brushless motors is provided, as well as an improved DC motor or like electrical rotary machine, and circuitry suitable for use in electrical motors. The circuitry can be retrofit into existing motors which utilize Hall-effect sensors, replacing those sensors and thereby achieving the advantages of increased reliability, wider temperature operating range, etc. in a cost effective manner, i.e. without having to replace the entire existing motor drive. New motors constructed according to the present invention also achieve the desired results of increased reliability and temperature range compared to conventional brushless DC motors, have precise velocity regulation, are simple to install, and have reduced motor cost, size, and weight compared to conventional motors, and quicker response time due to reduced rotor inertia.

According to one aspect of the present invention a method of enhancing a brushless DC motor having a plurality of Hall-effect sensors and a frequency-to-voltage conversion circuit is provided. The method comprises the steps of: (a) Deactivating or removing the Hall-effect sensors and the frequency-to-voltage conversion circuit, and (b) connecting a commutation error detector circuit and the DC motor to a voltage controlled oscillator and operatively connecting a solid-state circuit to the voltage controlled oscillator to provide output signals substantially the same as the Hall-effect sensors to thereby functionally replace the Hall-effect sensors. Step (13) may be practiced by operatively connecting a plurality of data (D) flip flops and a NAND gate to the VCO, as by connecting a switch between a VCO and a clock pulse (CP) input of each D flip flop. For example three D flip flops may be used and connected to the VCO through a switch.

It is also desirable according to the invention to achieve a number of other advantageous results for the existing motors. For example there may be the further steps of connecting a direction reverse circuit to the solid state circuit of step (b), connecting a start up circuit (e.g. a rotor alignment circuit) to the solid state circuit, and/or connecting a sampling logic circuit to the solid state circuit to construct sampling logic from the outputs of the solid state circuit so that which phase is a non-energized phase may be determined.

The invention also relates to a brushless sensorless electrical rotary machine, whether new or retrofit, such as a DC motor. The machine comprises: A rotor and a stator and including a plurality of windings driven by a multiphase inverter for selectively energizing the windings in sequence. A voltage controlled oscillator for controlling the frequency of the multiphase inverter, and having an output and an input. And, a solid state indirect rotor position sensing circuit operatively connected to the voltage controlled oscillator output to provide output signals substantially the same as those of Hall-effect sensors. The solid state indirect rotor position sensing circuit may comprise a plurality (e.g. three) of D flip flops, each having a CP input; and a NAND gate. Alternatively the sensing circuit may comprise a plurality of inverters, each connected to an AND gate and to a brushless DC gate drive circuit (as in a ML 4410 or ML 4411 chip). Alternatively the sensing circuit may comprise a programmable logic chip connected to a brushless DC gate drive circuit (e.g. in an ML 4410 or ML 4411 chip) to realize the same outputs as above mentioned.

A start-up circuit may also be connected to the machine, and include a switch for connecting the VCO output signal to the CP inputs of the D flip flops. A direction reverse circuit may be connected to the solid state indirect rotor positioning circuit, a sampling logic circuit may be connected up to the solid state indirect position sensing circuit to construct sampling logic from the outputs of the solid state indirect rotor position sensing circuit so that which phase is a non-energized phase may be determined, and a commutation error detection circuit may be connected to the input of the VCO.

The invention also relates to simple solid state circuitry per se which is particularly suited for use in the construction of brushless sensorless DC electric motors, but may have other applicability as well. The solid state circuit according to the invention comprises, in combination, the following elements: A voltage controlled oscillator having an input, and having an output. A plurality of D flip flops, each having a CP input. And, a NAND gate. The voltage controlled oscillator output is connected to the CP inputs of the D flip flops through a switch. A commutation error detector circuit may be connected to the input of the voltage controlled oscillator.

It is the primary object of the present invention to provide new and/or retrofit sensorless brushless DC motors or like electrical machines, and circuitry for achieving desired advantageous results. This and other objects of the invention will become clear from an inspection of the detailed description of the invention, and from the appended claims.

DETAILED DESCRIPTION OF THE DRAWINGS

Figure 1:
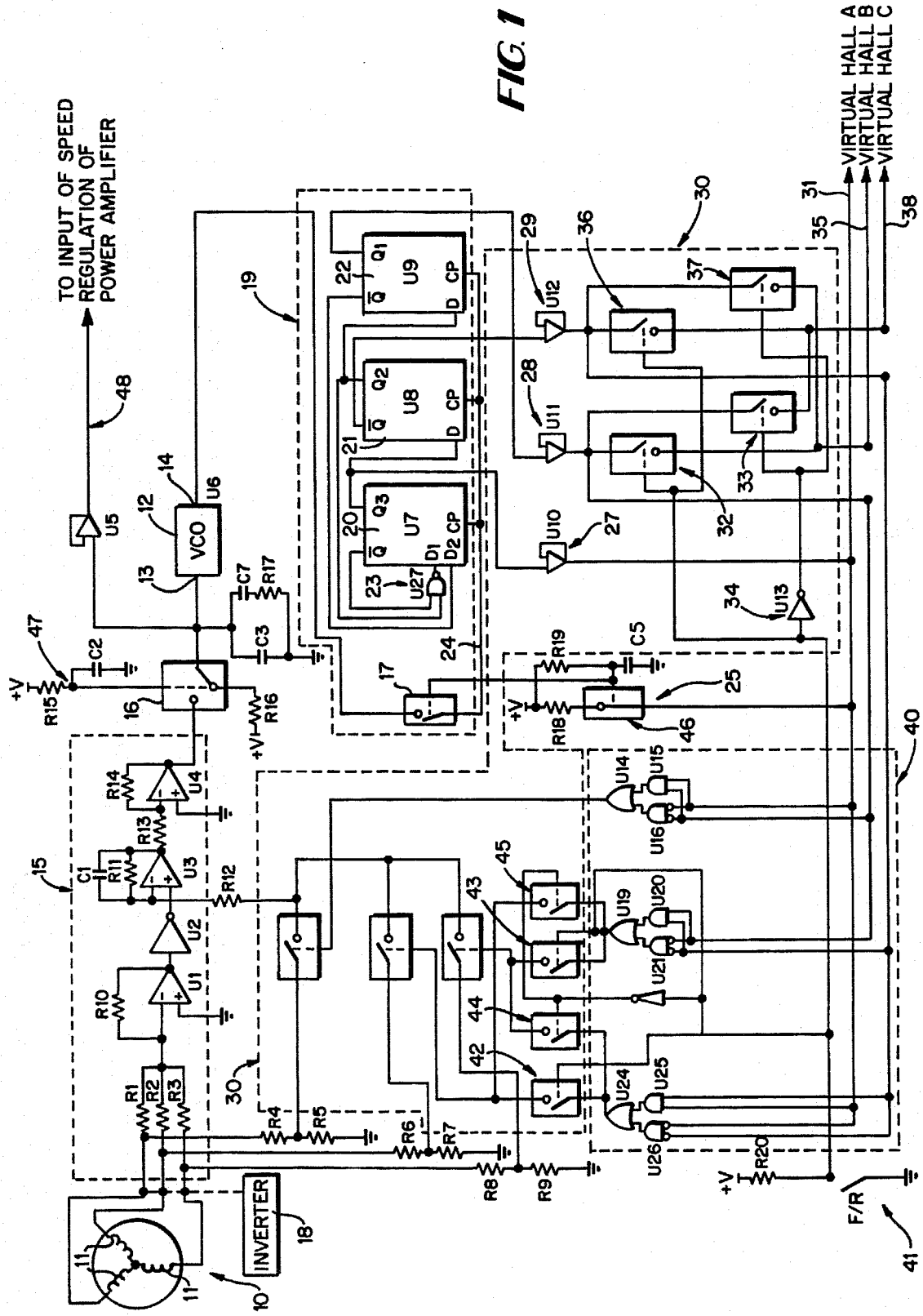
FIG. 1 is a desired circuit according to the present invention shown hooked up to a brushless DC motor.

All of the representations in FIGS. 1, 3, and 5–7 are conventional circuit and logic representations. A brushless sensorless electrical rotary machine, in the form of a DC motor, is shown generally by reference numeral 10 in FIG. 1, the machine 10 conventionally including a rotor and a stator as well as a plurality of windings 11. The complete circuit illustrated as connected up to the motor 10 windings 11 in FIG. 1 connected to a multiphase inverter for selectively energizing the windings 11 in sequence. The multiphase inverter is shown schematically at 18 in FIG. 1. An exemplary inverter 18 is shown in detail in FIG. 7, along with its connection to the windings 11.

As is conventional the complete circuit of FIG. 1 includes a voltage controlled oscillator (VCO) 12, having an input 13 and an outlet 14, for controlling the commutation frequency of the multiphase inverter 18. A commutation error detector circuit 15 and a switch 16 are connected between the windings 11 and the VCO input 13, and the output 14 from the VCO preferably leads to a switch 17.

According to the present invention instead of using Hall-effect sensors to sense rotor position and provide a signal to the inverter 18 to switch to the next phase and sequence when the rotor magnet axis reaches a predetermined position, a solid state circuit is provided. The solid state circuit 19 is operatively connected to the VCO 12 output 14 and provides output signals substantially the same as those of Hall-effect sensors. Therefore circuit 19 may be aptly known as a "virtual Hall signal generator", with a "virtual Hall output" corresponding to each of the Hall-effect sensors that would typically be associated with the motor 10 (e.g. three). The virtual Hall signal generator 19, seen in both FIGS. 1 and 3, and in the preferred embodiment illustrated therein, comprises a plurality of D flip flops 20, 21, and 22, respectively, and a NAND gate 23. Each flip flop 20–22 has two D inputs, two Q outputs, and a clock pulse (CP) input. The CP inputs are connected to the output 14 of the VCO 12, directly via line 24 as illustrated in FIG. 3, or through the switch 17, which is connected to a start up circuit 25, as illustrated in FIG. 1.

The outputs from the flip flops 20–22 preferably pass through buffers 27–29, respectively, providing three virtual Hall output signals in lines 31, 35, and 38. A circuit 30, including switches 32, 33, 36, and 37, as well as inverter 34, provide output signals equivalent to the outputs of three Hall sensors in a three phase permanent brushless DC motor. The circuitry 30 is a direction reverse circuitry, and rather than utilizing that circuitry the virtual Hall signals 31, 35, and 38 can be connected directly up to the buffers 27–29, respectively, as seen in FIG. 3.

Figure 2:
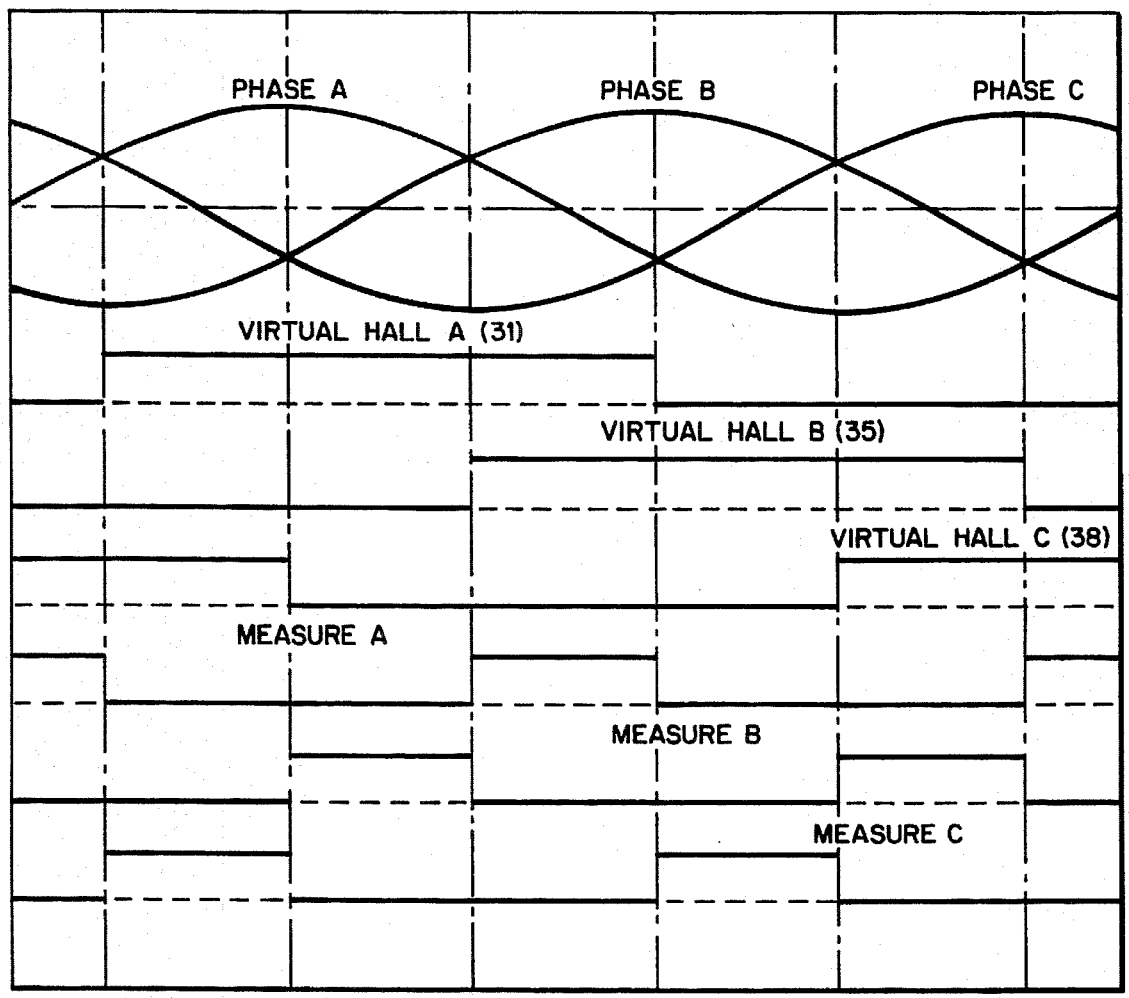
FIG. 2 is a waveform diagram illustrating the timing of a sequential energization of motor winding utilizing the circuit of FIG. 1.
Figure 4:
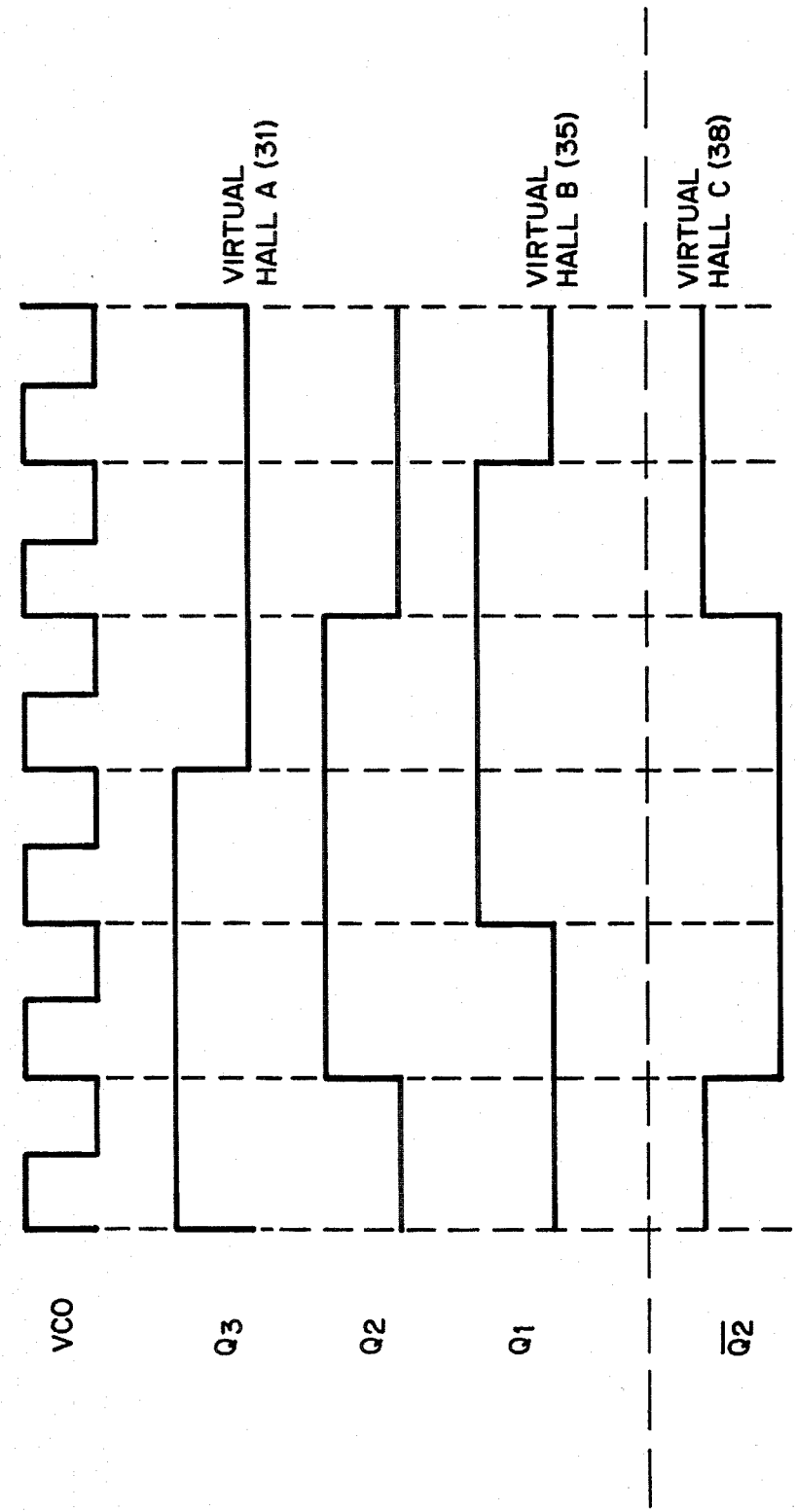
FIG. 4 is a waveform diagram comparing the outputs of the virtual Hall sensors of FIG. 3 to the VCO output.

FIG. 2 illustrates the waveforms of the virtual Hall output signals; the waveforms plotted against the VCO are also provided in FIG. 4, with the inverse of "Q2" (the signal 35) also plotted in FIG. 4.

Figure 3:
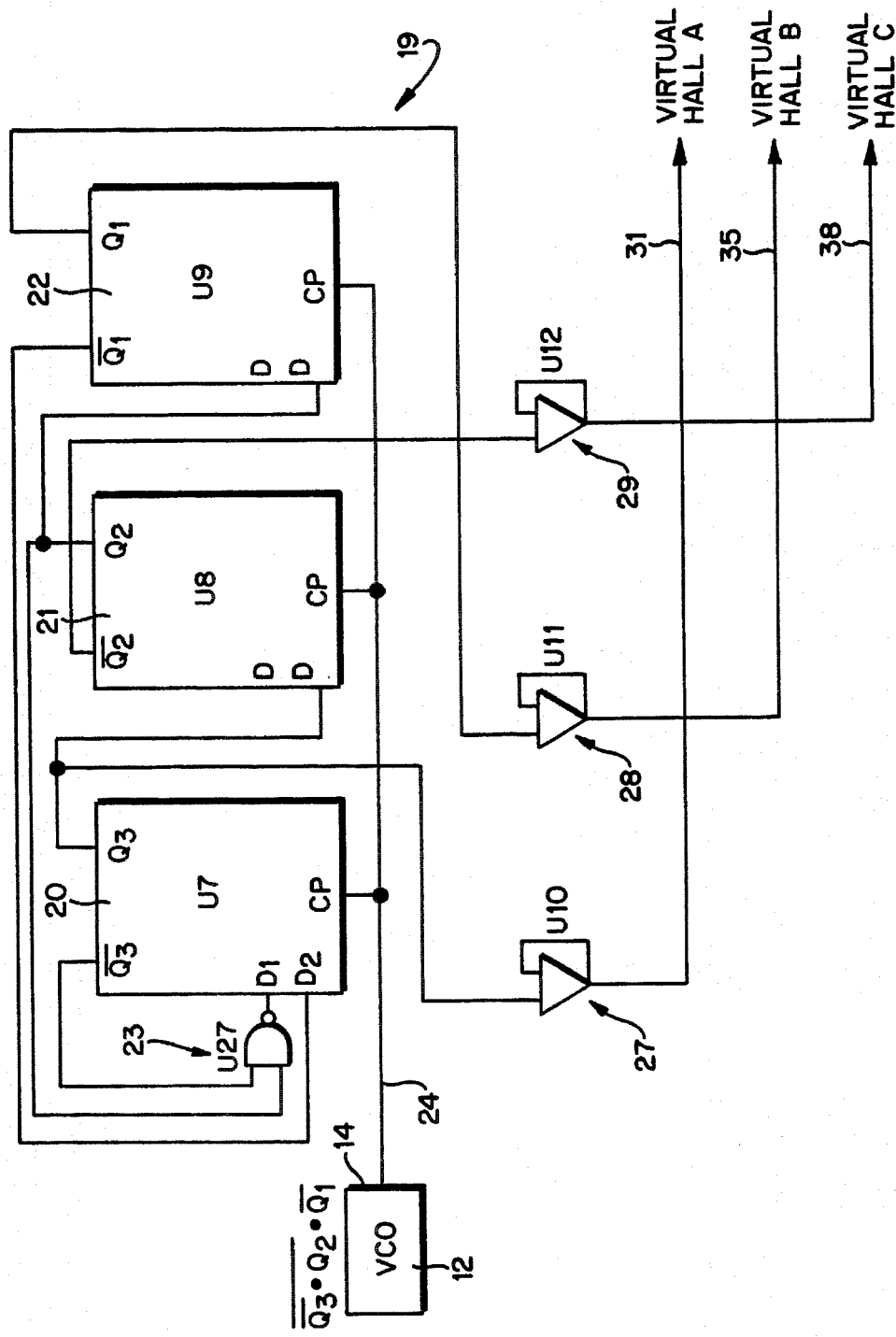
FIG. 3 is a detail schematic view of the solid state indirect rotor position sensing circuit of FIG. 1 according to the present invention which provides output signals substantially the same as those of Hall-effect sensors.

Utilizing the virtual Hall signal generator 19, connected up to the VCO 12 and other elements is seen in FIGS. 1 and 3, the filtered input of the VCO 12 is equivalent to the output of a frequency-to-voltage converter circuit in a brushless DC motor drive with Hall sensors. The output of the VCO 12, whose frequency is six times that of the motor commutation frequency, is connected up to the circuit 19 as illustrated in FIGS. 1 and 3. In FIGS. 1 and 3 the non-inverse outputs of the flip flops 20–22 are defined as Q3, Q2, and Q1, respectively, and are as plotted in FIG. 4. Q2 lags Q3 one VCO oscillating period, and Q1 lags Q2. Therefore Q1 lags Q3 two VCO oscillating periods. This time difference is two-thirds of the period of the motor commutation, in order words Q1 lags Q3 by 120°. Similarly, the inverse of Q2, i.e. $\overline{Q2}$, lags Q3 by 120°. Thus the outputs 31, 35, and 38 are the same as from phase A, phase B, and phase C Hall sensors in a conventional brushless DC motor.

The commutation error detector circuit 15 of FIG. 1 is provided such that the input for the integrator and the phase-locked loop of the circuit of FIG. 1 is designed so that the phase-locked loop will work for both "full on mode" and "PWM mode" of the motor drive. That is the components illustrated in the circuit 15 of FIG. 1 and the VCO 12 are utilized to form a phase-locked circuit to phase track the back EMF of the motor 10.

Within the circuit 15 the components C1, R11, R12, U3, and U4 cooperate with the VCO to form the phase lock circuit.

Also within the circuit 15, the circuit element formed by R1, R2, R3, R10, U1 and U2 is a summer. The output of U2 is designed to equal (R4/(R4+R5))*(VAO+VBO+VCO)/3, where VAO, VBO and VCO are the voltages of phase A, B, and C to the bus ground respectively. When the motor drive is in "full on" mode, or one of the bottom switches is on in "PWM" mode, (VAO+VBO+VCO)/3 is equal to V/2+1.5* (the phase-to-neutral induced voltage of non-energized phase). V is the bus voltage. When one of the bottom switches is off in "PWM" mode, (VAO+VBO+VCO)/3 is equal to V. The inverse input of the integrator, which consists of R11, R12, C1 and U3 is equal to (R4/(R4+R5))*(V/2+ the phase-to-neutral induced voltage of the non-energized phase) when the drive is in "full on mode" or one of the bottom switches is on the "PWM" mode, the inverse input is equal to V. Therefore the input voltage of the integrator is equal to the phase-to-neutral induced voltage of the non-energized phase, when the drive is "full on" or one of the bottom switches is on in "PWM". The input voltage is equal to zero when one of the bottom switches is off in "PWM". The design insures that PWM mode will not mislead the phase-locked loop for commutation error detection.

The circuit of FIG. 1 also includes sensing logic, provided by the sensing logic circuit 40. The circuit 40 constructs sampling logic from the outputs 31, 35, 38 of the virtual Hall signal generator circuit 19, and thus tells the phase-locked loop which phase is currently a non-energized phase. The waveforms of the sampling signal are also seen in FIG. 2 and are labelled "measure A", "measure B", and "measure C", respectively. A true table utilizing the virtual Hall A–C outputs (31, 35, 38), and the measures A–C, is as follows:

| Virtual Hall A | Virtual Hall B | Virtual Hall C | Measure A | Measure B | Measure C |
|---|---|---|---|---|---|
| 1 | 0 | 1 | 0 | 0 | 1 |
| 1 | 0 | 0 | 0 | 1 | 0 |
| 1 | 1 | 0 | 1 | 0 | 0 |
| 0 | 1 | 0 | 0 | 0 | 1 |
| 0 | 1 | 1 | 0 | 1 | 0 |
| 0 | 0 | 1 | 1 | 0 | 0 |

The logic relationships which can be derived from the true table are as follows:

Measure A=HA·Hb+$\overline{HA}$·$\overline{HB}$

Measure B=HB·HC+$\overline{HB}$·$\overline{HC}$

Measure C=HC·HA+$\overline{HC}$·$\overline{HA}$

The signal output with logic high among Measure A, B and C will turn the corresponding phase on and channel the voltage to the inverse input of the integrator.

In operation of the direction reverse circuit 30, when the switch 41 is at an open position the rotation direction of the motor 10 is in the forward direction. Switches 32, 36, 42, and 43 are closed, and switches 37, 33, 44, and 45 are open. When the switch 41 is closed, the switches 33, 37, 44, and 45 are closed while the switches 32, 36, 42, and 43 are open. That is phases B and C are switched, and the sampling sequence of phases B and C are reversed, and thus the motor rotation direction is therefore reversed.

The start up circuit 25 is provided to start the motor 10 because of low induced voltage of the motor at low speed. The circuit 25 includes a rotor alignment circuit, as illustrated in FIG. 1 which sets virtual Hall A output 31 with high logic, and the outputs 35, 38 with low logic, so that the top switch of phase A and the bottom switch of phase C will be closed and the magnetic axis of the rotor of the motor 10 will align with the axis of the phase B winding 11. The time for the alignment is controlled by the values of the resistor R19 and capacity C5. When the voltage on C5 is above the threshold of the switches S3 and S2 the switch 46 will open and switch 17 will be closed. The VCO 12 output 14 will be connected to the "Virtual Hall Signal Generator" 19. The motor 10 will be ramped up until the switch 16 is switched to the output of the VCO 12. The time for ramping up is controlled by the values of R15 and C2, of the open/close loop 47. When switch 16 is switched to the output of the commutation error detector 15, the commutation position feedback loop is then closed. Line/circuitry 48 is for speed regulation.

All of the circuitry of FIG. 1 will typically be provided for a newly constructed sensorless brushless DC motor (or other electrical rotary machine) according to the invention. Such a motor will have sensorless feedback circuitry, closed loop regulation, a flexible speed set, direction control, PWM switching frequency, adjustable maximum and minimum speeds, and may also have adjustable current limiting, adjustable gaining (stability), and/or adjustable acceleration or deceleration. A 15:1 speed range may be typical. Such a motor would have increased reliability compared to conventional DC brushless motors since the motor construction is simpler with less to go wrong, and the motor temperature would not affect electronics thereby reducing the chance for motor shorting. Also precise velocity regulation would be provided, as low as 0.1% off the set speed. Simple installation would be provided by a three wire random hook up. The motor would thus have reduced costs, size, and weight compared to conventional motors, and would have a quicker response due to reduced rotor inertia.

In addition to providing a reliable "new" motor, according to the present invention a method may be provided for enhancing brushless DC motor having a plurality of Hall-effect sensors and a frequency-to-voltage conversion circuit. This is simply accomplished by deactivating (as by electrically disconnecting) or removing entirely the Hall-effect sensors and the frequency-to-voltage conversion circuit from the existing motor. Then the virtual Hall signal generator solid state circuit 19 is connected to the VCO 12 in place of the Hall-effect sensors. Since the output signals 31, 35, 38 provided by the circuitry 19 are substantially the same as the Hall-effect sensor outputs, the solid state circuit 19 functionally replaces the Hall-effect sensors. This retrofitting allows existing motors—which number in the tens of thousands in the United States alone—to be provided with increased reliability and a number of the other benefits of the new motors according to the invention, heretofore described.

Retrofitting may also include connecting up the commutation error detector circuit 15 (which may replace a pre-existing circuit, or be new to the retrofit motor), connecting up a direction reverse circuit 30 to the circuit 19 as illustrated in FIG. 1, connecting up a start up circuit 25 (with switch 17) as also illustrated in FIG. 1, and/or connecting up a sampling logic circuit 40. Connecting up the sampling logic circuit 40 would allow construction of sampling logic from the outputs 31, 35, 38 so that which phase is a non-energized phase may be determined, as illustrated in FIGS. 2 and 4.

Figure 5:
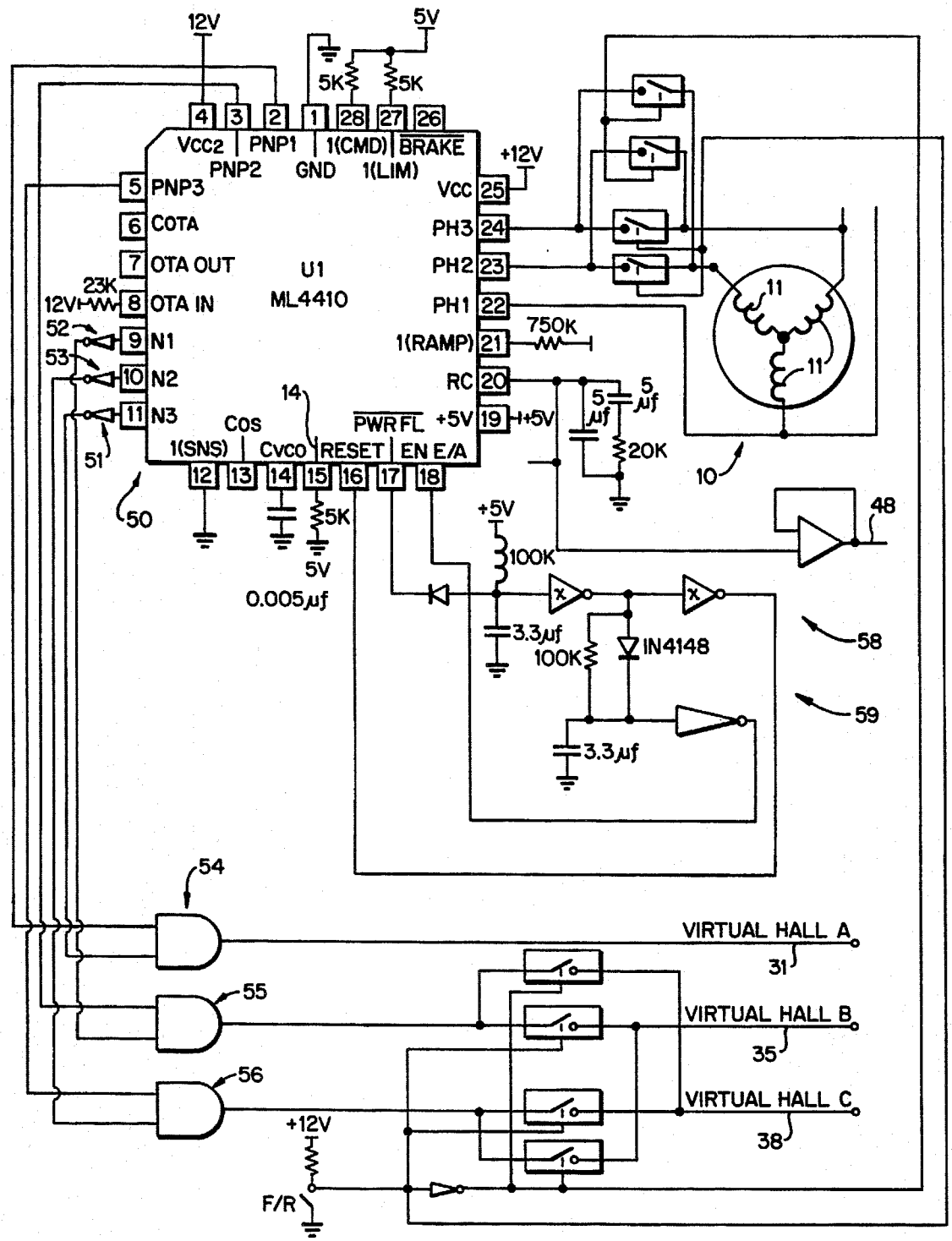
FIG. 5 is a circuit schematic illustrating a circuit functionally similar to that of FIG. 1 which utilizes a single commercially available chip as the major component thereof.

FIG. 5 schematically illustrates another embodiment according to the present invention. In FIG. 5 a back emf sampler, a VCO, and commutation logic circuitry are those already built in to the commercially available chip ML 4410, indicated generally by reference numeral 50 in FIG. 5, available from Micro Linear. An ML 4411 chip could be utilized in its place. A direction reverse circuitry similar to the circuit in FIG. 1 is formed around the chip 50. In the FIG. 5 embodiment, the virtual Hall signal generator circuit is different than in FIG. 1. It is provided by the brushless DC gate drive circuit which is built into the ML 4410 50, three inverters 51–53, and three AND gates 54, 55, and 56 respectively, providing the virtual Hall outputs 31, 35, 38 which are essentially the same as those outputs in FIGS. 1 and 3. The logic relationship between virtual Halls A, B and C with outputs of three upper gates, PNP1, PNP2 and PNP3, and three lower gates N1, N2 and N3 are:

Virtual Hall A=PNP1·$\overline{N3}$

Virtual Hall B=PNP2·$\overline{N1}$

Virtual Hall C=PNP3·$\overline{N2}$

The wire 48 in the FIG. 5 embodiment is connected to the error amplifier inverting input of any conventional state of the art analog brushless DC motor drive control, which powers the entire circuitry with its reference voltage output. Circuit 58 is a buffer circuit for speed feedback. Circuit 59 is a start up circuit.

Figure 6:
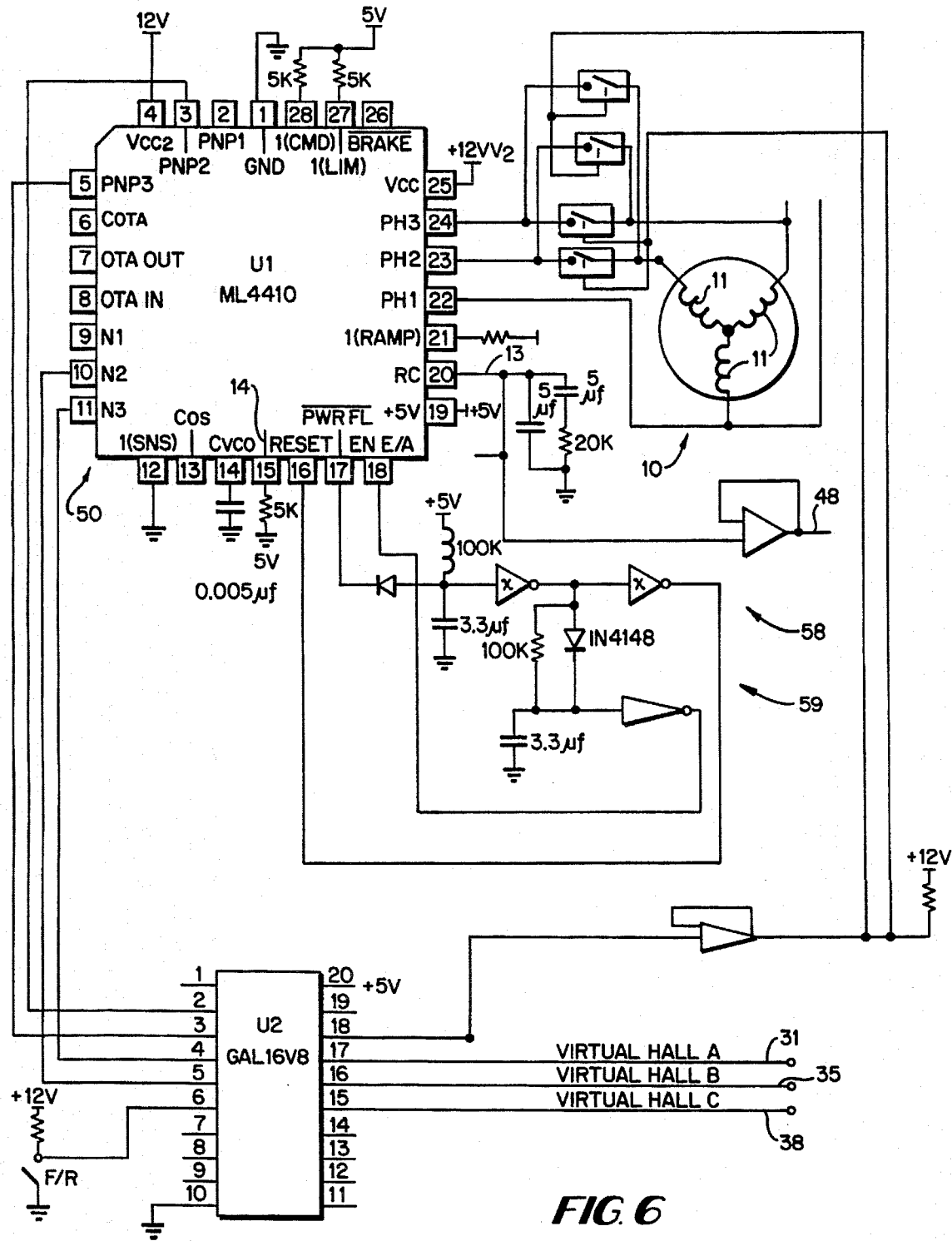
FIG. 6 is a circuit schematic illustrating a circuit functionally similar to that of FIG. 1 which utilizes a commercially available chip plus a programmable logic chip as major components thereof.
Figure 7:
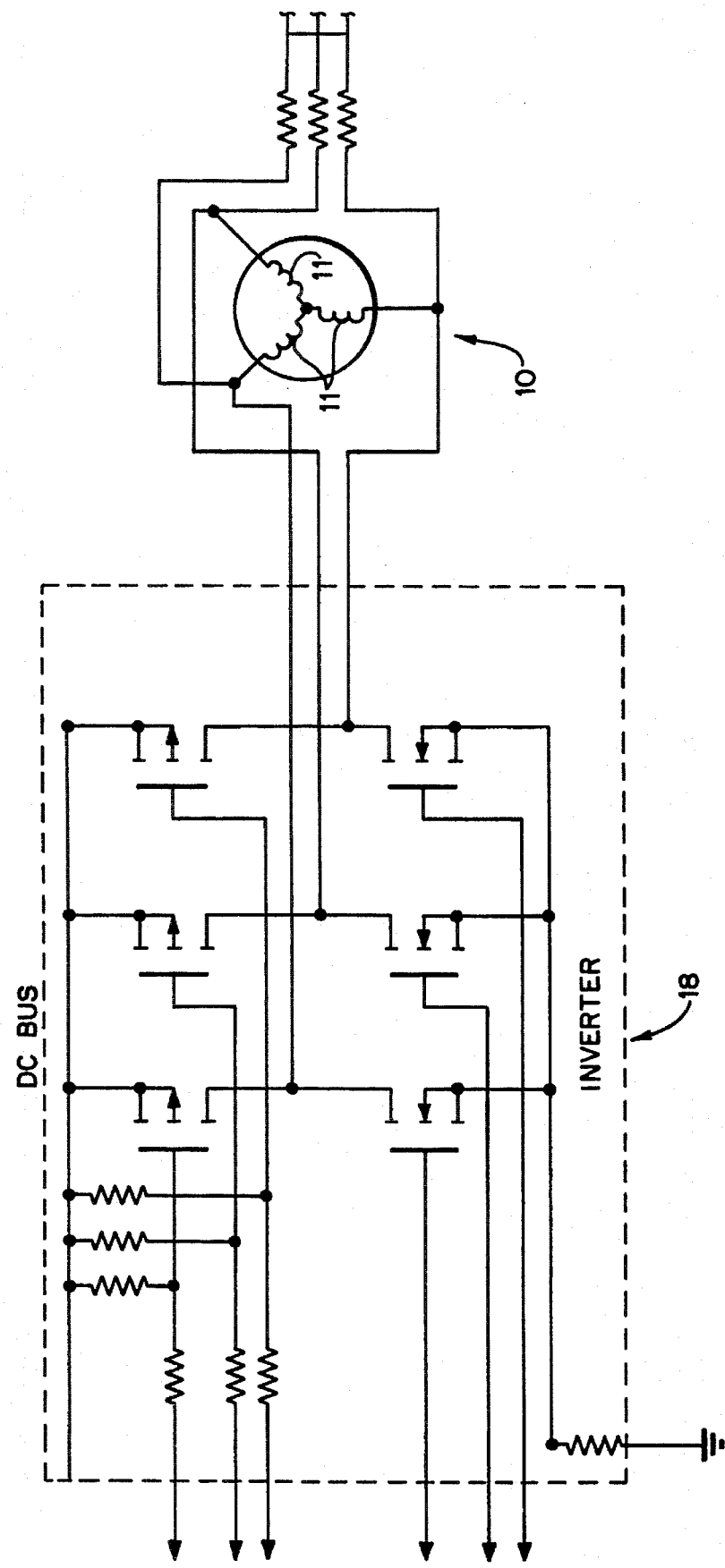
FIG. 7 is a circuit schematic illustrating in detail a connection of an exemplary inverter to a DC motor for the circuit of FIG. 1.

FIG. 6 schematically illustrates another embodiment according to the present invention. FIG. 6 is an evolution of FIG. 5. Because one of the outputs among PNP1, PNP1, and PNP3 can be constructed from the other two, such as PNP1 is high whenever PNP2 is not equal to PNP3, only two upper gates are necessary. Because one of the outputs among N1, N2 and N3 can be constructed from the other two, such as N1 is high when N2 is equal to N3, only two lower gates are necessary. The virtual Halls A, B and C can be expressed by:

Virtual Hall A = $\overline{N3}$ · PNP2 · $\overline{PNP3}$ + $\overline{N3}$ · $\overline{PNP2}$ · PNP3
Virtual Hall B = $\overline{N2}$ · N3 · (N2 + N3) · PNP2
Virtual Hall C = $\overline{N2}$ · PNP3

The logic relationship plus the direction reverse circuitry at the virtual Halls A, B and C can be realized by a programmable logic chip 60, such as commercially available lattice chip GAL16V8. The chip 60 is connected to the chip 50 in the manner illustrated in FIG. 6, to provide the virtual Hall outputs 31, 35 and 38 as illustrated in FIG. 6.

It will thus be seen that according to the present invention a highly advantageous method of enhancing functionality and operability of existing brushless DC motors is provided, as well as either a retrofit or new brushless sensorless electrical rotary machine (such as a DC motor), and circuitry useful in providing a virtual Hall signal generator. While the invention has been herein shown and described in what is presently conceived to be the most practical and preferred embodiment thereof it will be apparent to those of ordinary skill in the art that many modifications may be made thereof within the scope of the invention, which scope is to be accorded the broadest interpretation of the appended claims so as to encompass all equivalent structures and processes.

What is claimed is:

1. In combination in association with an electrical rotary machine:

a voltage controlled oscillator having an input, and having an output; and a plurality of D flip flops, each having a CP input;

a NAND gate;

said voltage controlled oscillator output connected to said CP inputs of said D flip flops through a switch, and said NAND gate connected to a current carrying line extending from each of first and second of said D flip flops; and a commutation error detector circuit connected to the input of said voltage controlled oscillator.

2. A combination as recited in claim 1 wherein said plurality of D flip flops comprises three D flip flops.

3. A combination as recited in claim 2 wherein said switch is connected between the CP input of each of said D flip flops and said voltage controlled oscillator.

4. A combination as recited in claim 3 wherein said electrical rotary machine comprises a brushless sensorless DC motor.

5. A combination as recited in claim 2 wherein said electrical rotary machine comprises a brushless sensorless DC motor.

6. A combination as recited in claim 1 wherein said switch is connected between the CP input of each of said D flip flops and said voltage controlled oscillator.

7. A combination as recited in claim 6 wherein said electrical rotary machine comprises a brushless sensorless DC motor.

8. A combination as recited in claim 1 wherein said electrical rotary machine comprises a brushless sensorless DC motor.

\* \* \* \* \*